United States Patent Office 3,432,574  
Patented Mar. 11, 1969

3,432,574
SCHIFF BASES PREPARED BY REACTING UNSATURATED CARBONYL COMPOUNDS WITH AMINE-TERMINATED POLYMERIC FATS
Marwan R. Kamal, Minneapolis, Minn., assignor to General Mills, Inc., a corporation of Delaware
No Drawing. Filed Dec. 23, 1963, Ser. No. 332,872
U.S. Cl. 260—834   16 Claims
Int. Cl. C08g 45/06

ABSTRACT OF THE DISCLOSURE

The invention relates to Schiff's bases formed by reaction of (a) olefinically unsaturated carbonyl compounds with (b) polyprimary amines wherein polymeric fat compounds are used to form such amines; and epoxy resin compositions, coatings or films and methods of forming or curing the same employing such Schiff's bases as curing agents.

---

This invention relates to certain new Schiff's bases, methods of making and using the same, compositions for use thereof and methods of using such compositions, and metal complexes thereof, and methods of making and using such metal complexes.

Although it will be appreciated that the instant Schiff's bases per se are useful as such, for example, as latent curing catalysts for epoxy resins, they are also useful as intermediates in the formation of other compounds, including the formation of metal complexes of Schiff's bases which, in turn, have unusual properties and uses.

Prior workers in the art, as is indicated in U.S. Patent No. 3,026,285, as only one of several examples, have mentioned the use of a complex of a primary amine and an aldehyde, which complex is known in chemistry as a Schiff's base, which is generally understood to be formed by the reaction of a primary amine and a carbonyl compound such as an aldehyde or ketone, in accordance with the following Equation A:

(A)

$$-NH_2 + O=\overset{|}{\underset{|}{C}} \rightleftarrows -N=\overset{|}{\underset{|}{C}} + H_2O$$

The foregoing reaction of Equation A is, of course, reversible, and the Schiff's base will thus react in the presence of moisture to produce the primary amine again. The initial reaction to form the Schiff's base is carried out under well known conditions for effecting the removal of water.

Epoxy resins have also been known and used commercially for some time, and these resins have been described in substantial detail in numerous publications and patents. For example, epoxy resins are described in substantial detail in such recently issued U.S. Patents as Nos. 2,923,696; 3,026,285; 3,067,170; 3,072,606; 3,072,607; 3,073,799; 3,079,367; 3,080,341; and 3,084,139, each of which patents is included herein by reference as disclosing typical epoxy resins which are used in the practice of the instant invention. It will be appreciated, however, that the use of the instant Schiff's base with epoxy resins involves only one of several uses therefor.

The fundamental chemistry of epoxy resins is comparatively simple. The epoxy resins are understood to contain the characteristic functional epoxy group, i.e.,

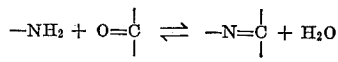

which characteristic functional group is understood to undergo cross-linking via primary amine groups, i.e., $-NH_2$; in accordance with the following general Equation B:

(B)

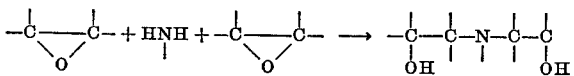

It will thus be appreciated that the azomethine linkage (i.e.

of the Schiff's base is suitable under certain circumstances for use as a latent epoxy curing agent, in that it will release the primary amine in accordance with the previous Equation A in a film or otherwise formed composition of an epoxy resin, upon adequate exposure to water or moisture of ambient atmosphere.

The instant Schiff's base, however, has been found to have not only advantageous properties as a latent epoxy curing agent (for reasons which include in particular its compatibility with the epoxy resinous material), but also the instant Schiff's base has been found to have unusual properties as an intermediate for the formation of metal complexes with Schiff's bases of this type which, in turn, may be filmed and cured with heat to obtain films having unusual hardness and heat resistance.

It is, therefore, an important object of the instant invention to provide an improved Schiff's base substance, an improved hardenable epoxy resin composition containing the same, an improved method of preparing a hardenable epoxy resin composition and infusible coatings or films therefrom, an improved method of preparing a new metal complex of a Schiff's base and improved methods of preparing films therefrom and the resulting infusible insoluble coatings or films obtained.

Other and further objects, features and advantages of the present invention will become apparent to those skilled in the art from the following detailed disclosure thereof, including the examples hereof.

In general, the instant invention consists in a new substance or material that is a Schiff's base formed by reaction of (a) a carbonyl compound whose molecule contains an olefinic unsaturation and (b) a polymeric aliphatic amine, having at least one primary amino group for reaction with the compound (a) to form such Schiff's base.

The general formula for the olefinically unsaturated carbonyl compound (a) preferred for use in the practice of the invention is, as follows:

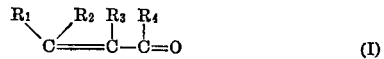

which is an alpha-beta unsaturated carbonyl compound that may be an aldehyde (if $R_4$ is H) or it may be a ketone (if $R_4$ is a $C_1$–$C_6$ hydro-carbon group, such as methyl, ethyl, propyl, isoproply, butyl, etc. including phenyl). The radicals or groups $R_1$, $R_2$, $R_3$ and $R_4$ may each be H or a $C_1$–$C_6$ hydrocarbon group, such as a phenyl or alkyl group. Preferably, however, the $R_1$ through $R_4$ groups contain no olefinic or acetylenic unsaturation, no more than a total of about 6 carbon atoms; and at least two or three of such radicals $R_1$ through $R_4$ are H.

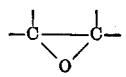

Typical specific examples of (I) include the following:

Acrolein:
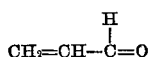
$$CH_2=CH-\overset{H}{\underset{}{C}}=O \quad (Ia)$$

Crotonaldehyde:
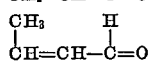
$$\overset{CH_3}{\underset{}{CH}}=CH-\overset{H}{\underset{}{C}}=O \quad (Ib)$$

Cinnamaldehyde:
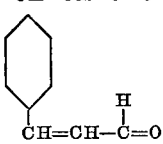
(Ic)

Methyl vinyl ketone
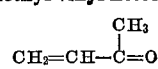
$$CH_2=CH-\overset{CH_3}{\underset{}{C}}=O \quad (Id)$$

Mesityl oxide
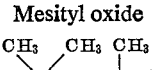
$$\overset{CH_3}{\underset{CH_3}{\diagup}}C=CH-\overset{CH_3}{\underset{}{C}}=O \quad (Ie)$$

Tiglaldehyde
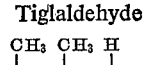
$$\overset{CH_3}{\underset{}{CH}}=\overset{CH_3}{\underset{}{C}}-\overset{H}{\underset{}{C}}=O \quad (If)$$

Methyl crotyl ketone
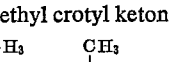
$$\overset{CH_3}{\underset{}{CH}}=CH-\overset{CH_3}{\underset{}{C}}-O \quad (Ig)$$

Acrylophenone
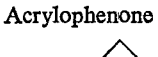
$$CH_2=CH-\overset{}{\underset{}{C}}=O \quad (Ih)$$

Chalcone
$$CH=CH-C=O \quad (Ii)$$

Propyl Acrolein
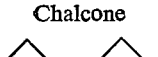
$$\overset{C_3H_7}{\underset{}{CH}}=CH-\overset{H}{\underset{}{C}}=O \quad (Ij)$$

The compounds (a) preferred for use in the practice of the invention are (Ia), (Ib) and (Ic) above.

The primary amine compound (b) used herein is polymeric, and it may be a simple dimeric material having the structure:

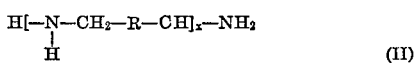
$$H[-\underset{H}{\underset{|}{N}}-CH_2-R-CH]_x-NH_2 \quad (II)$$

wherein $x$ is only one and R is a dimeric fat radical of linoleic acid, which may be processed through the known reaction routs from linoleic acid to dimerized linoleic acid to the corresponding dinitrile and then to the corresponding di-primary amine of the structure (II). Comparable di-primary amines (II) may be obtained from dimerized $C_8$–$C_{24}$ fatty acids, as:

$$H_2N-CH_2-R-CH_2-NH_2 \quad (IIa)$$

In addition, higher polymeric materials characterized by having one or more secondary amino linkages may be used, so long as they also have at least one and preferably two primary amine groups to react with compound (a) to form the Schiff's base. Such polymers useful in the present invention (have at least one and preferably two terminal primary amino groups for undergoing the Schiff's base formation, but) are characterized by the recurring structural unit:

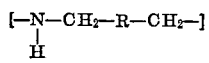
$$[-\underset{H}{\underset{|}{N}}-CH_2-R-CH_2-] \quad (III)$$

wherein R is a dimeric fat radical. These polymers are conveniently prepared by the condensation polymerization of a fatty dinitrile derived from a dimerized fat acid. In addition to the homopolymer products prepared by the homo-condensation of a fatty dinitrile, copolymer products can be prepared by the condensation copolymerization of a fatty dinitrile and a dinitrile copolymerizable therewith.

The condensation polymerization of the fatty dinitriles is accomplished by hydrogenating a fatty dinitrile under secondary-amine-forming conditions. By "secondary-amine-forming conditions" is meant that set of hydrogenation conditions under which a fatty nitrile preferentially forms a secondary amine rather than a primary amine. Secondary fatty amines are commercially available products and the conditions necessary to produce them are well understood in the art. Typical reaction conditions utilize hydrogen pressures in the range of 25 to 1000 p.s.i.g. at temperatures in range of 200 to 290° C.

The preparative reaction is illustrated by the following Equation C:

(C)
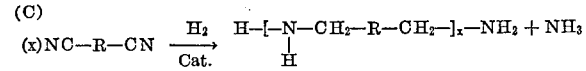
$$(x)NC-R-CN \xrightarrow[\text{Cat.}]{H_2} H-[-\underset{H}{\underset{|}{N}}-CH_2-R-CH_2-]_x-NH_2 + NH_3$$

where R is a dimeric fat radical and $x$ is the number of recurring units in the polymer chain. As illustrated in the equation, an ammonia by-product is formed. In order to obtain optimum yields of the desired polymer product, the ammonia by-product should be removed. Generally this is done by "sweeping" the reaction mixture with hydrogen gas.

Depending on the reaction conditions employed, the polymer products will vary in molecular weight from dimers in which $x$ in the foregoing Equation C is 2, to high molecular weight products in which $x$ is 40 or greater. The molecular weight of the polymer product can be varied by selection of the reaction conditions. Mild reaction conditions tend to produce lower molecular weight polymers while extremely severe reaction conditions produce insoluble cross-linked polymers. The lower molecular weight polymers are readily pourable, viscous liquids which resemble a heavy syrup. They are generally pale amber in color and are readily soluble in most common organic solvents. As the molecular weight increases, the products are generally more viscous, less soluble and darker in color. Products in which $x$ is about 20 are extremely viscous and are difficult to pour even when heated.

A hydrogenation catalyst is employed to carry out the reaction of the present invention. Generally, any nitrile hydrogenation catalyst can be employed. The preferred catalysts are Raney nickel and copper-chromite catalysts. Other suitable catalysts include Raney cobalt, platinum, palladium, palladium on charcoal, platinum on charcoal, nickel on kieselguhr, copper-nickel carbonate, cadmium-copper-zinc chromite, copper-nickel oxide, and the like.

The "copper-chromite catalyst" referred to above is often referred to as "copper-chromium oxide catalyst." Preparation of copper-chromite catalysts is discussed in an article by Connor, Folkers, and Adkins, in the "Journal of the American Chemical Society," vol. 54, pp. 138–45 (1932) and in "Reactions of Hydrogen with Organic Compounds over Cooper-Chromium Oxide and Nickel Catalysts" by Homer Adkins, University of Wisconsin Press, Madison, Wisconsin (1937). The nature of this catalyst is further discussed in an article by Adkins, Burgoyne, and Schneider in the Journal of the American Chemical Society, vol. 72, pp. 2226–29 (1950). Commercially available copper-chromite catalysts often contain amounts of catalyst stabilizers, e.g., barium oxide, calcium oxide, and magnesium oxide. Catalysts containing such stabilizers can be employed in the instant invention if desired. While many types of copper-chromite catalysts are commercially available and are generally useful in the instant invention, it is preferred to employ a catalyst containing 40 to 65% CuO (assuming all copper is present as CuO) and 35 to 60% $Cr_2O_3$ (assuming all chromium to be present as $Cr_2O_3$).

The amount of catalyst employed is not critical. However, the molecular weight and other properties of the polymer product will vary depending on the amount and type of catalyst used. Generally, catalyst in the amount of 1 to 10% by weight, based on the weight of the nitrile charge, is sufficient for most purposes. Larger and smaller amounts of catalysts can be employed if desired.

The dinitrile starting materials for preparing the polymers of the present invention are the dinitriles prepared from dimerized fat acids. Relatively pure dimerized fat acids can be distilled from commercially available polymeric fat acids mixtures. The term "polymeric fat radical" as used herein refers to the hydrocarbon radical of a polymeric fat acid. The term "polymeric fat acid" refers to a polymerized fat acid. The term "fat acid" as used herein refers to naturally occurring and synthetic monobasic aliphatic acids having hydrocarbon chains of 8–24 carbon atoms. The term "fat acids," therefore, includes saturated, ethylenically unsaturated and acetylenically unsaturated acids. "Polymeric fat radical" is generic to the divalent, trivalent and polyvalent hydrocarbon radicals of dimerized fat acids, trimerized fat acids and higher polymers of fat acids, respectively. These divalent and trivalent radicals are referred to herein as "dimeric fat radical" and "trimeric fat radical."

The saturated, ethylenically unsaturated, and acetylenically fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature. Suitable catalysts for the polymerization include acid or alkaline clays, di-t-butyl peroxide, boron trifluoride and other Lewis acids, anthroquinone, sulfur dioxide and the like. Suitable monomers include the branched straight chain, poly and mono ethylenically unsaturated acids such as 3-octenoic acid, 11-dedecenoic acid, linderic acid, lauroleic acid, myristoleic acid, tsuznic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, trimnodonic acid, eicosatetraenoic acid, nisinic acid, scoliodonic acid and chaulmoogic acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not currently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid, and isomic acid.

Because of their ready availability and relative ease of polymerization, oleic and linoleic acid are the preferred starting materials for the preparation of the polymeric fat acids.

The dimerized fat acid is then converted to the corresponding dinitriles by reacting the dimerized fat acid with ammonia under nitrile forming conditions. The details of this reaction are set forth in Chapter 2 of "Fatty Acids and Their Derivatives" by A. W. Ralston, John Wiley & Sons, Inc., New York (1948). If desired, the dinitrile may then be purified to the desired degree by vacuum distillation or other suitable means. Generally, the high purity dinitrile tends to produce linear polymers of high molecular weight. If appreciable amounts of mononitrile are present, the polymer will be of low molecular weight, since these materials act as chain-stoppers. The presence of trinitriles and other higher polyfunctional nitriles tends to produce a cross-linked polymer. A sufficient amount of trinitriles will provide a gelled product.

Copolymers can be prepared by copolymerizing mixtures of dinitriles. The desired dinitrile comonomer is added to the reaction mixture along with the fatty dinitrile. After subjecting the mixture to polymerization conditions, there is obtained a copolymer having randomly distributed recurring units:

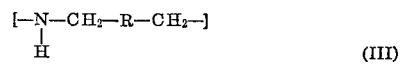

(III)

and

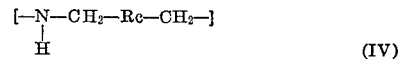

(IV)

where R is a dimeric fat radical and $R_c$ is a divalent radical derived from the comonomer dinitrile. Generally, any copolymerizable dinitrile can be employed. Specific examples of simple nitriles which can be employed as comonomers include the dinitriles derived from such acids as adipic acid, pimelic acid, suberic acid, azelaic acid, and sebacic acid (e.g. wherein $R_c$ is a polymethylene group). Mixtures of two or more fatty dinitriles can also be copolymerized. A large variety of other dinitriles are likewise useful.

In theory, the formation of the polymeric amine proceeds through the preliminary reduction of the nitrile to the primary amine followed by conversion of the primary amine to the polymeric secondary amine. Accordingly, this provides an alternate route for the preparation of the polymers. In the alternate route, the polyamines (i.e. $H_2N-CH_2RCH_2NH_2$ hereof) are formed separately and then converted to the polymeric amines under the conditions previously described, although it is possible to use somewhat milder conditions. In this instance, it is possible to use a variety of other polyamines as comonomers including some comonomers such as metaxylylene diamines which may not be readily employed in the form of nitriles.

From a practical standpoint, there may be certain advantages in thus carrying out the preparation of the polymeric amines in two steps since it makes possible the removal of any by-products formed in the first step, i.e., the formation of the primary amine and thus enhances the purity of the final product.

Generally, the end groups of the polymers of the present invention will be either amine groups or nitrile groups. Where the polymers are prepared by condensing amines, all the end groups will be primary amines:

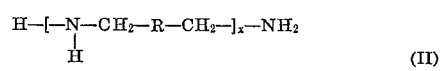

(II)

where R and x are as previously defined. Where a dinitrile is used as the starting material and the reaction conditions are mild and the reaction time is short, the end groups will be mainly nitrile groups:

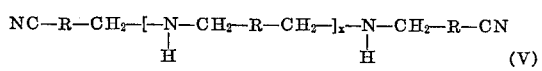

(V)

wherein R and x are as previously defined. Substance (V) is, of course, not desired for use in the invention, since there must be at least one primary amino group in compound (b). When dinitriles are used as the starting material, under many reaction conditions a mixture of polymers will be obtained, some chains terminating in nitrile groups and other chains terminating in (primary) amine groups. Where severe reaction conditions are utilized, the degradation of functional groups may cause some chains to terminate in hydrocarbon groups.

The invention will be better understood with respect to the following examples which illustrate certain preferred embodiments of the present invention. Unless otherwise specified, all parts and percentages used herein are by weight.

EXAMPLE I

Into a 1 liter stirred autoclave were charged 417 grams of distilled dimer nitrile prepared from dimerized linoleic acid and 10 grams of water-wet Raney nickel catalyst. The autoclave was flushed with hydrogen, sealed under 150 p.s.i.g. hydrogen and rapidly heated to 200° C., at which time a continuous venting of hydrogen was begun such that the hydrogen coming into the autoclave was at 240 p.s.i. and the actual pressure in the autoclave was approximately 230 p.s.i. Heating was continued until the desired reaction temperature of 270° C. was reached. The hydrogenation was continued at this temperature for a period of 1⅓ hours. The reaction mixture was then cooled to below 200° C. and the catalyst was filtered off. There was obtained a product having a Brookfield viscosity of 114 poises at 25° C., a molecular weight of 4600 and an inherent viscosity of 0.165 as measured on a 0.5% solution is meta-cresol. Infrared analysis indicated that no nitrile groups were left in the product. The product contained 12.4% primary amine groups, 72.7% secondary amine groups, and a 5.5% tertiary amine groups.

EXAMPLE II

Example I was repeated except 21 grams of a commercially available copper-chromite catalyst "G–13," manufactured by The Girdler Company of Louisville, Kentucky, was substituted for the Raney nickel catalyst of Example I. There was obtained a product having a Brookfield viscosity of 4220 poises at 25° C., a molecular weight of 10,100 and an inherent viscosity of 0.262 as measured on a 0.5% solution in meta-cresol. The product contained 8.0% primary amine groups, 84.4% secondary amine groups, 5.1% tertiary amine groups, and no nitrile groups.

EXAMPLE III

Example II was repeated except that the reaction was run at 250° C., for a period of 5⅓ hours. There was obtained a product having a Brookfield viscosity of 6200 poises at 25° C., a molecular weight of 11,000, and an inherent viscosity of 0.335 as measured on a 0.5% solution in meta-cresol. The product contained 6.5% primary amine groups, 85.9% secondary amine groups, 5.7% tertiary amine groups, and no nitrile groups.

EXAMPLE IV

Example II was repeated except that the reaction time was increased to 2 hours. There was obtained a product having a Brookfield viscosity of greater than 20,000 poises at 25° C., a Brookfield viscosity of 6400 poises at 60° C., a molecular weight of 9900, and an inherent viscosity of 0.334 as measured on a 0.5% solution in meta-cresol. The product contained 7.0% primary amine groups, 81.4% secondary amine groups, 7.6% tertiary amine groups, and no nitrile groups.

EXAMPLE V

Into a 1 liter stirred autoclave were charged 400 grams of crude undistilled dimer nitrile prepared from vacuum stripped dimerized linoleic acid, and 100 grams monomer nitrile prepared from the recovered monomeric acid obtained from the polymerization of linoleic acid, and 25 grams of copper-chromite of Example II. After hydrogenation at 280° C. for 1⅓ hours, there was obtained a product having a Brookfield viscosity of 241 poises at 25° C., 6.9% primary amine groups, 81.2% secondary amine groups, 5.6% tertiary amine groups, and 2.8% nitrile groups.

EXAMPLE VI

A crude undistilled dimer nitrile prepared from vacuum stripped dimerized linoleic acid was treated with a mixture of copper-chromite catalyst recovered from the reaction mixture of a previous successful hydrogenation and diatomaceous earth. The level of catalyst used in this pre-treatment was about 5% by weight, based on the nitrile. The dimer nitrile was recovered by filtration. Into a 1 liter stirred autoclave were charged 442 grams of the treated dimer nitrile and 21 grams of the copper-chromite catalyst of Example II. After hydrogenation at 280° C. for 1⅓ hours, there was obtained a product having 9.2% primary amine groups, 71.9% secondary amine groups, 5.8% tertiary amine groups, and 5.6% nitrile groups. The product had a Brookfield viscosity of 639 poises at 25° C. and a molecular weight of 4200.

EXAMPLE VII

A crude undistilled dimer nitrile prepared from vacuum stripped dimerized linoleic acid was washed with 1.5 grams of sodium hydroxide which had been dissolved in ethanol. After separating the solutions, 400 grams of the treated dimer nitrile and 20 grams of the copper-chromite catalyst of Example II were charged into 1 liter autoclave. After hydrogenation at 280° C. for 1½ hours there was obtained a product having a molecular weight of 3000, a Brookfield viscosity at 25° C. of greater than 20,000 poises and a Brookfield viscosity at 60° C. of 1,260 poises. Analysis of the product indicated that it had 15.8% primary amine groups, 60.7% secondary amine groups, 9.4% tertiary amine groups, and no nitrile groups.

EXAMPLE VIII

Into a 1 liter stirred autoclave were charged 530 grams of a distilled dimer nitrile having an iodine value of 8.5 prepared from a distilled dimer acid essentially saturated by hydrogenation having an iodine value of 8.4 and 25 grams of the copper-chromite catalyst of Example II. After hydrogenation for 3 hours at 270° C. there was obtained a product having an apparent molecular weight of 5,800, an iodine value of 10.3, a Brookfield viscosity of greater than 20,000 poises at 25° C., and a Brookfield viscosity of 2,240 poises at 60° C. The product contained 9.6% primary amine groups, 76.7% secondary amine groups, 5.4% tertiary amine groups, and no nitrile groups.

EXAMPLE IX

Example VIII was repeated except that 9.6 grams of methanol-wet Raney nickel was used as a catalyst for 400 grams of nitrile. After hydrogenation at 270° C. for 1⅓ hours, there was obtained a gelled product.

EXAMPLE X

Into a 1 liter stirred autoclave were charged 405 grams of distilled dimer nitrile prepared from dimerized linoleic acid, 81 grams of adiponitrile, and 25 grams of the copper-chromite catalyst of Example II. After hydrogenation at 270° C. for 2 hours, there was obtained a copolymer product having 6.3% primary amine group, 49.6% secondary amine groups, 18.1% tertiary amine groups, a Brookfield viscosity of 338 poises at 25° C., and a Brookfield viscosity of 60 poises at 60° C.

EXAMPLE XI

Example I was repeated except that the hydrogention was carried out at a reaction pressure of 90 p.s.i. for 4 hours at 232 to 248° C. using 10 g. of methanol-wet Raney nickel catalyst. There was obtained a product having 1% primary amine groups, 72.3% secondary amine groups, 6.1% tertiary amine groups, 11.8% nitrile groups, an iodine value of 83.4, and a Brookfield viscosity of 660 poises at 25° C.

EXAMPLE XII

Into a 1 liter stirred autoclave was charged 300 grams of a distilled dimer diamine having a total amine number of 205.1 as compared to theoretical value of 20.42 which was prepared by hydrogenating dimer nitrile in the presence of ammonia, and 12 grams of methanol-wet Raney nickel catalyst. After hydrogenating the mixture for 2 hours using the conditions of Example I, there was obtained a polymeric product having 23.3% primary amine groups, 69.5% secondary amine groups, 4.8% tertiary amine groups, and a Brookfield viscosity of 65.2 poises at 25° C.

EXAMPLE XIII

Into a 1 liter stirred autoclave was charged 68 grams of meta xylylene diamine, 291 grams of the distilled dimer diamine of Example XII, and 10 grams of the copper-chromite catalyst of Example II. After hydrogenating for 1⅔ hours using the reaction conditions of Example I, there was obtained a copolymeric product having an amine number due to secondary amines of 117.8. In comparison, the product of Example XII had an amine number due to secondary amines of 76.6 and the product of Example III had an amine number due to secondary amines of 90.3. The higher amine number for the product of this example indicates a larger weight percent of secondary amine groups due to formation of the copolymer.

Preparation of the Schiff's base

In preparing the Schiff's base the amine (b) of each of the foregoing Examples I through XIII is reacted with the Schiff's base forming carbonyl compound (a) in substantially an equimolecular proportion under relatively mild conditions typical for a Schiff's base formation and sufficiently non-drastic to have any significant effect upon the unsaturation in the compound (a), e.g., by oxidation or polymerization type reactions. The Schiff's base reaction (A) is, of course, carried out under conditions accommodating the ready removal of water in order to minimize reversibility of the reaction, and in the presence of a mild catalyst such as anhydrous potassium carbonate and using preferably a solvent such as benzene which readily removes water azeotropically under mild conditions of reflux. Actually, the compounds (a) and (b) are in many instances liquid under standard conditions and could really be mixed (under anhydrous or mild dehydrating conditions for water removal) in the simplest form of the reaction, but preferably the reaction is catalyzed as indicated and mild heating with a solvent that readily removes the water such as benzene is employed with relatively slow admixing of the reactants for ease of temperature control, and the resulting product is readily concentrated and/or filtered under reduced pressure to obtain a relatively pure product, which is soluble in conventional organic solvents such as methylene chloride, chloroform, benzene, toluene, isopropanol, and n-butanol.

EXAMPLE XIV

A distilled dimer amine (derived from a dimeric linoleic acid) is used having the following analysis: 204.7 amine number, 0.3% monomer; 97.1% dimer; and 2.6% trimer. A mixture of 55 grams (0.1 mole) of the foregoing dimer amine, 6 grams of anhydrous potassium carbonate and 150 milliliters of benzene is charged into a 500 milliliter, 3-neck flask fitted with a thermometer, a stirrer and an addition funnel containing 5.6 grams (0.1 mol) of acrolein dissolved in 50 milliliters of benzene. The mixture is stirred and the benzene solution of acrolein is added over a 2 hour period, with a slight tendency toward an increase in temperature. The mixture is stirred for an additional hour, then the thermometer is replaced by a Barrett-trap connected to a condenser and the resulting reaction mixture is heated to reflux, to collect water in the trap. After six hours of refluxing no more water is being collected, and the heat is stopped. After cooling the mixture is filtered to remove potassium carbonate and the filtrate is concentrated under reduced pressure to obtain a viscous residue weighing 58.8 grams and having an inherent viscosity of 0.09 in 1% meta-cresol at 30° C. The percent nitrogen found is 4.63, compared to calculated 4.76. Infrared spectra shows the —C=N— stretch at 5.97 microns and the secondary amine at 8.83 microns and the absence of any aldehyde carbonyl.

EXAMPLE XV

A mixture of 165 grams (0.3 mol) of the foregoing dimer amine of Example XIV, 18 grams of anhydrous potassium carbonate and 350 milliliters of benzene is placed in a 1 liter, 3-neck flask fitted with a stirrer, a Barrett-trap with a condenser and an addition funnel containing 16.8 grams (0.3 mol) of acrolein in 50 milliliters of benzene. The mixture in the flask is heated until the benzene begins refluxing, and then the acrolein solution is added over a one hour period. Water is collected during this addition and reflux continues for four additional hours after the addition was completed. The resulting reaction mixture is then cooled and filtered and the filtrate concentrated under pressure to give 171 grams of a viscous residue having an inherent viscosity of 0.11 in 1% meta-cresol at 30° C. The infrared spectra is identical to that obtained in previous Example XIV, and the percent nitrogen found is 4.66.

It will be appreciated that the dimer amine employed in Examples XIV and XV is replaced by an equimolar proportion of polymeric amine obtained in any one of the previous Examples I through XIII, using otherwise exactly the procedures of Examples XIV or XV, and the resulting product has a substantially identical infrared spectrum with respect to the presence of azomethine linkage, the presence of secondary amine linkage and the absence of aldehyde carbonyl; but in each case the difference in starting materials will show a difference in the calculated and found nitrogen.

Also, each of the foregoing Examples XIV and XV is repeated using an equimolar proportion of solutions of any one of the previously described unsaturated carbonyl compounds (a), and specifically the previously identified compounds of the group (Id) through Ij); and although the calculated and found percent nitrogen differs in each case, it will be appreciated that the infrared analyses will shown that the carbonyl linkage has been converted and secondary amine and azomethine linkages will be indicated as being present.

EXAMPLE XVI

Repeating the procedure of the first paragraph of Example XV, but using 165 grams (0.3 mol) of the previously identified dimer amine of Example XV, and 21 grams (0.3 mol) of crotonaldehyde dissolved in benzene, the condensation of the first paragraph of Example XV is carried out to obtain 179.7 grams of a viscous product having an inherent viscosity of 0.10 in a 1% solution of meta-cresol and the percent nitrogen calculated is 4.64 whereas the percent nitrogen found is 4.66.

EXAMPLE XVII

Repeating the procedure of Example XVI just described, except that in place of the crotonaldehyde, 39.65 grams (0.3 mol) of cinnamaldehyde is used and there is obtained a product of 176.3 grams of a viscous material with an inherent viscosity of 0.09 in a 1% meta-cresol solution. The percent nitrogen calculated for this product is 4.22 and that found is 4.24.

The procedures of Examples XVI and XVII are repeated with comparable results using any one of the polymeric amine products of the previous Examples I through XIII, again with a resulting product having the infrared analysis characteristics hereinbefore described and the general properties of solubility and the viscosity hereinbefore described, but with variations in nitrogen content calculated and found, all as previously indicated hereinbefore. These Schiff's base products of the invention are useful as latent curing catalysts in epoxy resins using generally weight ratios of (1) epoxy resin to (2) the aforesaid Schiff's base within the range of 7:3 to about 1:1, and a preferred ratio of 3:2. As a typical example, using a commercially available liquid epoxy resin identified as GX190 (which is a Bisphenol A-Epichlorohydrin Exoxy resin having an equivalent weight of 190) with about two-thirds the weight thereof of the Schiff's base product of Example XIV one obtains a substantially homogeneous composition after about two hours of mixing. The use of a small amount of solvent eliminates this time lag. Films made from the resulting homogeneous mixture are found to cure in about one day to give tough, hard, glossy coatings of superior properties.

Repeating the foregoing procedure using 60 grams of the aforesaid GX190 liquid epoxy resin with 40 grams of the Schiff's base product of Example XVI (plus about 6 grams of n-butanol to assist in mixing the same), the mixture becomes homogeneous quite rapidly and, in the absence of any water addition thereto, has a more than adequate "pot life," or period of time before it starts setting up. The addition of water, of course, accelerates the setting up of the composition. The composition is filmed on tin panels with a conventional film applicator at thicknesses of 1½, 3 and 5 mils and cured at 73° F. and 50% relative humidity, and it is found that tack-free coatings are obtained within about one day, having the characteristic tough, glossy, infusible, insoluble characteristics of cured epoxy resin films.

Substantially the same results are obtained using an equal weight proportion of any of the Schiff's bases described hereinbefore in connection with Examples XV and XVII. In addition, suitable conventional additives such as pigments, fillers, and the like may be incorporated in the compositions, although the so-called "hardenable components" of the compositions in each case comprise or consist essentially of the hardenable liquid epoxy resin and the aforesaid Schiff's base.

Metal complexes of the Schiff's bases of the invention

In general, it is known that metal complexes of nitrogen compounds are quite heat stable (J. Org. Chem., vol. 27, 592, 1962). The instant metal complexes of the Schiff's bases of the invention, however, are unusual in that they are relatively simple, relatitvely inexpensive and readily obtained from fatty nitrogen derivatives. Heretofore metal complexes of nitrogen compounds were usually solids or gels; whereas the complexes of the instant invention have unusual advantages in handleability in that for the most part they are low viscosity liquids which are generally clear and they have been found to have a very substantial, in fact, apparently indefinite pot life when sealed, which is a very definite advantage in the field of heat curable coatings. Also, the complexes of the invention generally appear to cure at reasonable times and reasonable temperatures, for example, about 45 minutes at 150° C.; but they produce extremely heat stable coatings, exhibiting heat stability in the range of 500° F. to 600° F. for periods up to 1½ hours or longer in the absence of any serious physical degradation (although sometimes with some discoloration). It will also be appreciated that by the use of excessive amounts of metal and such metal complexes one obtains highly conductive films (e.g. such as may be employed in the uses suggested in Chem. & Eng. News, vol. 40 (9), 86, Feb. 26, 1962). In addition, extensibilities of up to 60% or greater have been demonstrated for certain of these films cured from the instant metal complexes, and this combination of high heat resistance plus a practical degree of extensibility is very significant in a number of uses. Film thicknesses of up to 5 mils have been found to cure very satisfactorily, although the foregoing involves only curing at reasonable temperatures in the presence of ambient atmosphere (i.e. air), and it will be appreciated that the incorporation of oxidation agents or other accelerators in the metal complexes of the invention should permit comparable curing of films of greater thickness, since the curing of these films has indicated that it involves both heat and at least some oxidation, hence it is a heat-and-oxidation curing procedure, which is typical for many known curable films.

The metal complexes of the instant Schiff's bases are formed very easily, merely by bringing into contact in an adequately compatible, inert system a compatible metal salt of the metal and the Schiff's base. Usually this is done in the presence of a mutual inert solvent such as butanol or butanol-toluene, using a suitably compatitbtle metallic salt (generally of either a weak acid or a volatile type of aninoic component which is readily released from the system without any harmful effect). Preferably metal salts of the simple organic acids such as acetic, propionic or the like acids may be used or even simple carbonates or ammonium carbonates may be used (since the latter are often used for solubilizing more difficulty soluble metallic ions). Usually all that is required is slight warming and adequate agitation to obtain homogeneity and the resulting metal complexes, e.g., from the addition of cupric acetate monohydrate or zinc acetate dihydrate to butanol solutions of the Schiff's bases described in Examples XIV or XVI results in the formation of the liquid metal complex. Even the addition to these complex forming systems of nominal amounts of moisture in the form of water of hydration in the metal salts does not appear to be harmful, although this would seem to be a procedure that is less desirable from the point of view of stability during storage. In the case of the previously mentioned cupric and zinc salts, however, this does not appear to be the case. In fact, the liquid metal complexes of the invention are found to have unusual storage stability when sealed so as to avoid exposure to air, carbon dioxide and/or various oxidative reactants.

EXAMPLE XVIII

A charge of 15 grams of the Schiff's base of Example XVI hereof is dissolved in 25 milliliters of n-butanol. To this is added a charge of 4.8 grams of cupric acetate monohydrate, and the mixture is warmed gently until the cupric compound goes into solution and homogeneity is obtained. Films cast from this solution or complex in thicknesses of about 3 mils on glass and tin panels are heated for 45 minutes in an oven at 150° C. to obtain a hard glossy film on the panels that is insoluble in n-butanol. Impact resistance tests on the tin panels so coated showed that this hard film has about 10% extensibility.

EXAMPLE XIX

A procedure is carried out that is the same as that described in Example XVIII except that 2.4 grams of cupric acetate monohydrate are used instead of 4.8 grams and it is found that 20% extensibility in the cured film on the tin panel is obtained, but the results are otherwise the same. The weight ratio of copper to Schiff's base in this example is roughly 1:20. It will be appreciated that at ratios below about 1:50 the advantages of the use of the metal complex or the presence of the metal become less significant; where as ratios of metal to Schiff's base of as much as 1:5 by weight may be used to advantage, and even higher ratios may be used in instances when a highly conductive film is desired.

EXAMPLE XX

A charge of 49.5 grams of zinc acetate dihydrate is stirred into a charge of 235 grams of the viscous liquid Schiff's base of previously described Example XVI and the mixture is warmed gently for a few minutes with rapid stirring until a homogeneous solution is obtained. Flims of this resulting metal complex in thicknesses of about 1½ mils are drawn on tin, glass and steel panels and such panels are then heated in an oven at 150° C. for one hour. Impact resistance tests performed on the tin plate showed better than 60% extensibility. The insolubility of the cured film on the glass panel is demonstrated by boiling the same in toluene, and then subjecting film to n-butanol for one-half hour, which results in no apparent evidence of dissolution of the film. The steel panel thus obtained is maintained at 600° F. for 1½ hours in an oven and it is found that the cured film thereon retains its hardness and glossiness after this period of time, although some darkening is exhibited in the film.

EXAMPLE XXI

A charge of 7.5 grams of the Schiff's base obtained in the previous Example XVI is dissolved first in 20 milliliters of n-butanol and 5 milliliters of toluene; and then a charge of 1.65 grams of zinc acetate dihydrate is added thereto and mixed with mild heating until a homogeneous solution is obtained. Films of 3 mils thickness were cast from this solution and cured at 150° C. for ½ hour and these films exhibited essentially the same properties hereinbefore described in connection with the immediately previous example.

EXAMPLE XXII

A charge of 7.5 grams of the Schiff's base obtained in Example XIII hereof is first dissolved in 20 milliliters of n-butanol and 5 milliliters of toluene; and to this is added 1.5 grams of copper acetate monohydrate which is thoroughly mixed with the charge with mild heating until a homogeneous solution is obtained. The resulting copper complex is cast in films of 3 mils thickness on tin, glass and steel panels by heat-and-oxidation curing in an oven at 150° C. for about ½ hour and it is found that the films harden and become solvent resistant. Impact resistance tests on the tin panel show approximately 10 to 20% extensibility. The steel panel is placed in an oven at 500° F. for 2 hours, and it is found that upon cooling the copper complex film appears to have retained its adhesion and hardness, although it has darkened during this treatment.

The procedure of the previous paragraph is carried out to obtain comparable results using the Schiff's bases of previous Examples XIV, XV and XVI in the same quantity described in the previous paragraph, and using the procedure of the previous paragraph; although it is found that the Schiff's bases employed using essentially aliphatic carbonyl compounds (I), e.g., (Ia), (Ib), (Id), (Ie), (If), (Ig) or (Ij), will be found to have better heat stability than comparable products derived from carbonyl compounds containing aryl groups in instances involving high temperature tests at least.

In addition, any of the foregoing procedures described in this example may be repeated using, in place of the copper salt herein specified other compatible copper salts (containing approximately the same copper content by weight) and/or other metal salts (containing approximately the same metal content by weight), such as calcium acetate (monohydrate), barium acetate (monohydrate), barium propionate (monohydrate), calcium propionate, strontium acetate, magnesium acetate, cadmium acetate, lead acetate, cobaltous acetate, nickelous-acetate, ferrous acetate (and similar transition metal salts); rare earth metal salts including ceric ammonium nitrate, $(NH_4)_2Ce(NO_3)_6$, and cerous acetate which are available in substantially pure form and in the crude or technical grade which also includes the corresponding rare earth salts of lanthanum, neodymium, praseodymium, terbium, yttrium and samarium; also the hereinbefore amphoteric polyvalent metal salts and others such as aluminum acetate; bismuth, antimony, manganous and chromium acetates; titanium and/or vanadium ammonium, $(NH_4)_4$ or $(NH_4)_6$, carbonates, etc. It will be appreciated that the metals preferred in one class are the amphoteric polyvalent metals which seem to function quite well and in another class are simply the transition metals which also function quite well. In any event, the metals used are capable of forming coordinate bonds or readily coordinating with a Schiff's base to form the requisite metal complex.

The metal complexes thus formed have applicability in the field of liquid ion exchange and corrosion inhibition at high temperatures, as well as specific characteristics typical of salts or complexes of certain of the individual metals.

It will be noted that the more difficultly soluble metal salts of ammonium complexes are set forth hereinbefore and these include such materials as titanium ammonium carbonate and the rare earth ammonium nitrates, which are, in fact, metal complexes in their own right, but by the use of controlled conditions using, e.g., butanol as the common solvent, complexes of these metals with the Schiff's bases are obtained. The mechanism is believed to involve preferably divalent tetra-coordinate metal ions which include Mn, Fe, Co, Ni, Cu, Mg, Zn and Be (all available as acetates, chlorides and/or acetylacetonates) in a chelation-type complex formation; and complexes of each using the corresponding salt are obtained in the procedure of Example XX.

Theory of invention

Although it is not desired to limit the invention to any particular theory, it is believed that in the Schiff's base-forming reaction between the unsaturated carbonyl compound (a) and the primary amine compound (b) there are at least two possible competing reactions, which may be represented by the following equations:

(A) The Schiff's base reaction:

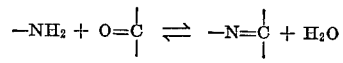

and (D):

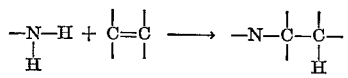

Reaction (A) is believed to proceed more rapidly than reaction (D), so it is believed that in the case of a molar excess of compound (a) the terminal groups in the reaction product will be converted according to Equation A from primary amino groups to the azomethine group of the Schiff's base. The theoretical possibility is quite complicated, but is suggested in Equation E, hereinafter:

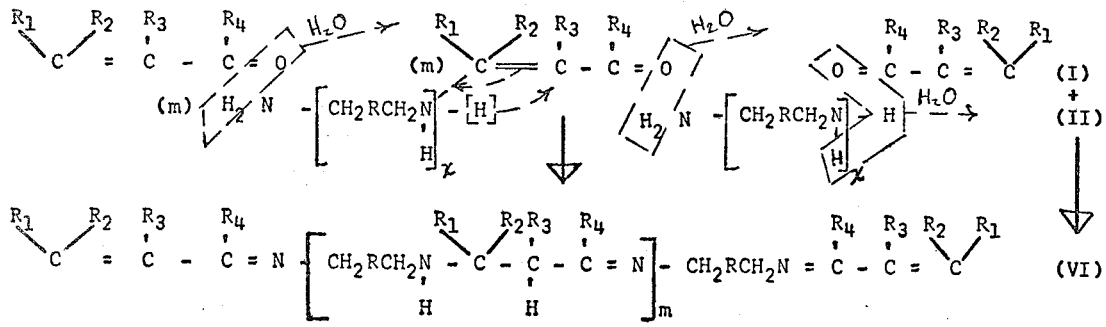

The foregoing (VI) is theoretically possible, if $m$ and $x$ are both 1; but if they are more than 1, then the subsequent (VII) polymer Schiff's base becomes theoretically possible.

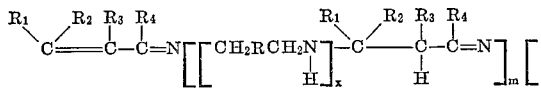 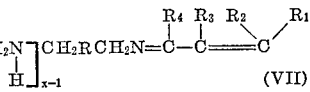
(VII)

In the foregoing theoretical possibilities (VI) and (VII), it will be seen that it is desirable to have the primary amino groups of (II) converted either to azomethine groups or linking secondary amino groups, via Equation D, and infrared analyses of products (VI) and (VII) indicates the presence of secondary amino groups (i.e. at 8.83 microns) which is not conclusive in the case of polymeric (II) as a starting material, which also contains the secondary amine grouping. However, infrared spectra of the products, theoretically suggested as (VI) and (VII), also shows the Schiff's base, azomethine linkage (i.e.

at 5.97 microns) and shows the absence of aldehyde carbonyl, which serves in part to verify the theoretical suggestions.

The terminal groups indicated at Y and Y' hereinbefore, e.g., in (VI) or (VII) are thus unconverted primary amino groups, but preferably Schiff's base groups as indicated, and probably consist of mixtures thereof with the latter groups predominating in preferred embodiments. Terminal olefinic unsaturation in such Y or Y' groups, to the extent that it is actually retained in the products, could materially assist in the heat-and-oxidation-cure of films.

Whatever the structure of the products, as suggested in (VI) and (VII), it has been found preferable to use a polymeric dimer amine (II) wherein $x$ is 1 to 40 or more and relative molar amounts of such starting materials (I) and (II) that the molar ratios are substantially equal, ranging from about 3:2 to 2:3 and the resulting recurring unit:

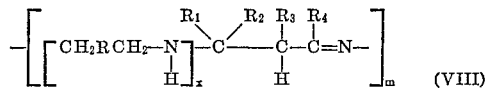
(VIII)

which is believed to exist in the product molecular structure as a polymeric unit (independently or in spite of technical difficulties in verifying details of the end groups) has a value for $m$ ranging from substantially 1 to 20, and preferably about 2 to 5. The Schiff's base product is also believed to predominate in the terminal end grouping, which is referred to as a Y or Y'. In Examples XIV and XVI hereof the value for $x$ is substantially 1 and $m$ averages within the range of 2 to 5. In the procedures described in the latter part of Examples XV and XVII (using the polymeric amines of Examples I through XIII) values of $x$ in the range of 2 to 40 and $m$ in the range of 1 to 20 are obtained.

*Theory of metal complex formation*

The formation of metal complexes of organic compounds, and specifically nitrogen compounds, has been studied to some extent and some generalizations have been attempted on the theoretical bases of chelation (Chelation, vol. 3, p. 17, McGraw-Hill Encyclopedia of Science and Technology, 1960). In such complex formation, practically all metal cations are found to form coordinate bonds with at least some functional organic groups, such bonds presumably being formed by the free electron pair of a donor atom (i.e. the point of attachment) of the "ligand" or chelating agent or group. If the ligand has two such points of attachment it is called a "bidentate" ligand; and with three such points, a "tridentate" ligand; etc.

In general, nitrogen, oxygen and sulfur (and sometimes phosphorous) are understood to serve as the electron donor atoms in the majority of chelating agents. The complex forming compounds of the present invention are organic nitrogen-containing compounds (or ligands). The cations preferred for complex formation in the practice of the invention include polyvalent $Zn^{+2}$, $Cu^{+2}$, $Cd^{2+}$, $Co^{3+}$, $Ni^{2+}$, $Hg^{+2}$, $V^{3+}$ (as well as monovalent $Cu^+$, $Ag^+$ and $Au^+$) all of which have exhibited a distinct preference for nitrogen as the donor atom. Other polyvalent metal cations preferred include $Cr^{3+}$, $Fe^{3+}$ and the transition metals generally, which as a group show preference for coordination through nitrogen rather than oxygen. The invention, however, also contemplates complex formation with other metal cations which are more often known to chelate with ligands containing at least one oxygen donor atom, such polyvalent cations including $Be^{+2}$, $Mg^{+2}$, $Ca^{+2}$, $Sr^{+2}$, $Ba^{+2}$ (of Group II–A); $Al^{+3}$, $Ga^{+3}$, $In^{+3}$, $Te^{+3}$ (of Group III–A); Group III–B cations, the rare earth (e.g., Ce and Th) and actinide series; Group IV–A metals such as $Sn^{4+}$, $Ge^{4+}$ and $Pb^{4+}$; Group IV–B metals, such as $Ti^{+4}$ and $Zr^{+4}$. Also, capable of coordination with nitrogen and, therefore, contemplated for use in the formation of metal complexes of the invention are Group V–B cations such as V, Nb and Ta; Group VI–B cations such as Mo and Cr; Mn (of Group VII–B); and the Group VIII–B transition metals of which Fe, Co and Ni are preferred. The cations of Group I–B and II–B, plus such transition metal cations of Group VIII–B, have already been indicated as being preferred for use in the invention.

The general knowledge of the art has indicated that a Werner complex-forming chelating agent must be at least bidentate or polydentate (which is the case of the compounds of the invention); and, although it has been recognized that the polydentate may coordinate with different cations which would thus link polydentates together in polymer-type structures, most of the studies by workers in the art have been devoted to chelation of a cation by coordination with at least two points of attachment in a given polydentate to effect ring closure in a heterocyclic ring containing a "nuclear" cation. Most common among these are 5- and 6-membered rings, whose heat-stability has been studied primarily on the basis of retaining the specific ring in its initial chelated form. Thus, remarkable heat stability is attributed to the copper phthalocyanin complex which is stable (presumably as such) in the vapor phase near 500° C. Although 7-, 8- and even larger membered rings were believed to form in certain instances, their lack of stability was recognized.

In 1956, Marvel et al. (J. Amer. Chem. Soc., vol. 78, 4905) generalized that sexadentates were less stable than quadridentates, in comparing Schiff's bases of hydroxy aryl aldehydes and diprimary amines (to form the quadidentates) and diprimary disecondary amines (to form the sexadentates). In 1961, Goodwin and Bailar (J. Amer. Chem. Soc., vol. 83, 2467) added a note of confusion to the field by indicating that the trends suggested by Marvel and other prior workers did not follow, in certain instances. In addition, these studies, in so far as they related to N compounds, always seemed to involve the presence of an oxygen donor (in the hydroxy aryl group) and very short ($C_2$) linkages between secondary amino N atoms (as in poly ethylene poly amine groups) neither of which are characteristics of the ligand structures of the invention. Moreover, the stability results reported were inconclusive.

In 1962, Johns and Di Pietro (J. Org. Chem., vol. 27, 592) reported some unusual heat stabilities in the entirely different systems involving solid metal complexes of tris-(2-hydroxyphenyl)-triazines (which they described as probably involving a combination of O and N donor coordinate bonds with a polyvalent cation, e.g. $Cu^{+2}$, $Be^{+2}$ and $Zn^{+2}$) which they formed as infusible solids resulting directly from interaction of the triazine chelating agent and a solution of the cation salt.

The foregoing serves to indicate a knowledge of some general principles in this art, but no conclusive evidence as to stability trends, e.g., in connection with polydentate ligands consisting essentially of only N donor groups, as in the case of the instant Schiff's bases. The instant Schiff's bases coordinate readily with the cations hereinbefore specified; but they form an initial liquid complex of superior stability and solubility under conventional storage conditions, which complex may thus be filmed or otherwise conveniently handled in useful condition such as a solution adapted to film on a substrate before conversion to the highly heat-stable infusible, insoluble, adherence film ultimately obtained. The initial or final complex stability can hardly be explained on the conventional basis of chelation ring closure, e.g., between the secondary amine N atoms in the present system, as in

(R–I)

because the R radical herein would presumably be so large as to create a wholly unstable ring.

The Schiff's base linkage may have basis for a potential 6-membered ring:

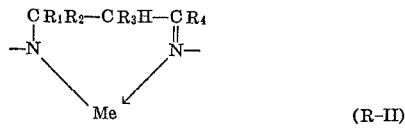
(R–II)

but such rings (R–II) would presumably be isolated at the end of polymer chains and combinations of fused (R–I) and (R–II) rings appear impossible or improbable. Moreover, the Goodwin article seems to indicate that satisfaction of all the coordinate cation valences is important, which, of course, is not possible in the ring (R–II) hereof. Nevertheless the complex does form and in a uniquely advantageous form for handling in solution, and later for conversion to the infusible film form.

Although the art has advanced to the stage where the (Werner) complex formation per se may be readily recognized primarily by observation of the formation of a homogeneous system when, as in the present case, the metal salt and the organic nitrogen compound of the invention are intimately admixed (usually with mild warming), the exact molecular structure of the present metal complexes, either before or after conversion to the insoluble infusible film form, has not yet been determined; and the storage stability and solubility of the liquid form, as well as the heat-stability, infusibility, insolubility and adherence to the substrate of the cured film forms, have not been explained on the basis of any specific theory of molecular structure.

It will be understood that modifications and variations may be effected without departing from the spirit and scope of the novel concepts of the present invention.

I claim as my invention:

1. As a new substance, a Schiff's base formed by reaction in substantially from 3:2 to 2:3 molar ratios of (a) a carbonyl compound whose molecule contains an alpha-beta unsaturation selected from the group consisting of an aldehyde and a ketone and (b) a compound having the general formula:

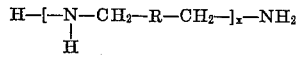

wherein $x$ is an integer from 1 to 40 and R is a hydrocarbon group of at least 14 carbon atoms consisting of a dimeric fat radical.

2. As a new substance, a Schiff's base formed by reaction in substantially from 3:2 to 2:3 molar ratios of (a) a carbonyl compound whose molecule contains an olefinic unsaturation selected from the group consisting of an aldehyde and a ketone and (b) a polymer having the recurring structural unit:

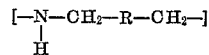

wherein R is a hydrocarbon group of at least 14 carbon atoms consisting of a dimeric fat radical, said polymer (b) having at least one primary amino group for reaction with compound (a) to form such Schiff's base.

3. As a new substance, a Schiff's base formed by reaction in substantially equi-molecular proportions of (a) a carbonyl compound whose molecule contains an alpha-beta unsaturation selected from the group consisting of an aldehyde and a ketone and (b) a compound having the general formula:

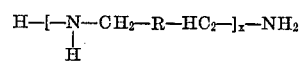

wherein $x$ is an integer from 1 to 40 and R is a dimeric fat radical of dimerized linoleic acid.

4. As a new substance, a Schiff's base formed by reaction in substantially from 3:2 to 2:3 molar ratios of (a) a carbonyl compound whose molecule contains an alpha-beta unsaturation selected from the group consisting of an aldehyde and a ketone and (b) a polymeric condensation product of an aliphatic diprimary diamine wherein the aliphatic group is a hydrocarbon group of at least 14 carbon atoms consisting of a dimeric fat radical.

5. As a new substance, a Schiff's base formed by reaction in substantially from 3:2 to 2:3 molar ratios of (a) a carbonyl compound whose molecule contains an alpha-beta unsaturation selected from the group consisting of an aldehyde and a ketone and (b) a copolymeric condensation product of an aliphatic diprimary diamine wherein the aliphatic group is a hydrocarbon group of at least 14 carbon atoms consisting of a dimeric fat radical and a copolymerizable aliphatic diamine.

6. As a new substance, a Schiff's base formed by reaction in substantially equi-molecular proportions of (a) a carbonyl compound whose molecule contains an alpha-beta unsaturation selected from the group consisting of an aldehyde and a ketone and (b) a copolymeric condensation product of an aliphatic diprimary diamine wherein the aliphatic group is a dimeric radical of dimerized linoleic acid.

7. As a new substance, a Schiff's base formed by reaction in substantially equi-molecular proportions of (a) a carbonyl compound whose molecule contains an alpha-beta unsaturation selected from the group consisting of an aldehyde and a ketone and (b) a copolymeric condensation product of meta xylylene diamine and an aliphatic diprimary diamine wherein the aliphatic group is a dimeric fat radical of dimerized linoleic acid.

8. As a new substance, a Schiff's base formed by reaction in substantially from 3:2 to 2:3 molar ratios of (a) a carbonyl compound whose molecule contains an alpha-beta unsaturation selected from the group consisting of an aldehyde and a ketone and (b) a copolymer having randomly distributed recurring units:

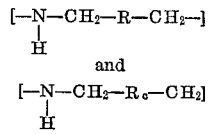

wherein R is a hydrocarbon group of at least 14 carbon atoms consisting of a dimeric fat radical and $R_c$ is a dimeric aliphatic chain, said copolymer having at least one primary amine group for reaction with compound (a) to form a Schiff's base.

9. As a new substance, a Schiff's base formed by reaction in substantially from 3:2 to 2:3 molar ratios of (a) a carbonyl compound whose molecule contains an alpha-beta unsaturation selected from the group consisting of an aldehyde and a ketone and (b) a compound having the general formula:

$$H\text{—}[\text{—}N(H)\text{—}CH_2\text{—}R\text{—}CH_2\text{—}]_x\text{—}NH_2$$

wherein $x$ is an integer from 1 to 40 and R is a hydrocarbon group of at least 14 carbon atoms consisting of a dimeric fat radical, said Schiff's base reaction product having terminal molecular groups selected from the class consisting of primary amino groups and Schiff's base groups formed from such primary amino group.

10. As a new substance, a polymeric Schiff's base formed by reaction in substantially equi-molecular proportions of (a) an alpha-beta unsaturated carbonyl compound selected from the group consisting of an aldehyde and ketone and (b) a polymer having the recurring structural unit:

$$[\text{—}N(H)\text{—}CH_2\text{—}R\text{—}CH_2\text{—}]$$

wherein R is a hydrocarbon group of at least 14 carbon atoms consisting of a dimeric fat radical, said polymer (b) having at least one primary amino group for reaction with compound (a) to form such Schiff's base, said polymeric reaction product having the following recurring structural unit:

$$Y\text{—}\left[\text{—}(CH_2DCH_2N(H))_x\text{—}C(R_1)\text{—}C(R_2)(H)\text{—}C(R_3)(R_4)\text{=}N\text{—}\right]_m\text{—}Y'$$

wherein D is a hydrocarbon group of at least 14 carbon atoms consisting of a dimeric fat radical, $x$ is an integer from 1 to 10, $m$ is an integer from 2 to 5, $R_1$, $R_2$, $R_3$ and $R_4$ contain a total of not more than 6 carbon atoms and are each selected from the group consisting of H and $C_1$–$C_4$ alkyl groups and Y and Y' are each selected from the class consisting of primary amino groups and Schiff's base groups formed from such primary amino groups.

11. A composition whose hardenable components comprise a mixture of (1) a hardenable liquid epoxy resin and (2), as a latent curing agent therefor, a Schiff's base formed by reaction in substantially from 3:2 to 2:3 molar ratios of (a) a carbonyl compound whose molecule contains an olefinic unsaturation selected from the group consisting of an aldehyde and a ketone and (b) a polymer having the recurring structural unit:

$$[\text{—}N(H)\text{—}CH_2\text{—}R\text{—}CH_2\text{—}]$$

wherein R is a hydrocarbon group of at least 14 carbon atoms consisting of a dimeric fat radical, said polymer (b) having at least one primary amino group for reaction with compound (a) to form such Schiff's base.

12. A coating composition consisting essentially of a mixture of (1) a hardenable liquid epoxy reaction product of a polyfunctional halohydrin and a polyhydric phenol and (2), as a latent curing agent therefor, a Schiff's base formed by reaction in substantially from 3:2 to 2:3 molar ratios of (a) a carbonyl compound whose molecule contains an olefinic unsaturation selected from the group consisting of an aldehyde and a ketone and (b) a polymer having the recurring structural unit:

$$[\text{—}N(H)\text{—}CH_2\text{—}R\text{—}CH_2\text{—}]$$

wherein R is a hydrocarbon group of at least 14 carbon atoms consisting of a dimeric fat radical, said polymer (b) having at least one primary amino group for reaction with compound (a), the weight ratio of (1):(2) ranging from substantially 7:3 to 1:3.

13. A process of producing a coating which comprises intimately admixing (1) a hardenable liquid epoxy resin and (2), as a latent curing agent therefor, a Schiff's base formed by reaction in substantially from 3:2 to 2:3 molar ratios of (a) a carbonyl compound whose molecule contains an olefinic unsaturation selected from the group consisting of an aldehyde and a ketone and (b) a polymer having the recurring structural unit:

$$[\text{—}N(H)\text{—}CH_2\text{—}R\text{—}CH_2\text{—}]$$

wherein R is a hydrocarbon group of at least 14 carbon atoms consisting of a dimeric fat radical, said polymer (b) having at least one primary amino group for reaction with compound (a) to form such Schiff's base and filming the resulting mixture onto a substrate.

14. A process of producing a coating which comprises intimately admixing (1) a hardenable liquid epoxy reaction product of a polyfunction halohydrin and a polyhydric phenol and (2), as a latent curing agent therefor, a Schiff's base formed by reaction in substantially from 3:2 to 2:3 molar ratios of (a) a carbonyl compound whose molecule contains an alpha-beta unsaturation selected from the group consisting of an aldehyde and a ketone and (b) a compound having the general formula:

$$H\text{—}[\text{—}N(H)\text{—}CH_2\text{—}R\text{—}CH_2\text{—}]_x\text{—}NH_2$$

wherein $x$ is an integer from 1 to 40 and R is a hydrocarbon group of at least 14 carbon atoms consisting of a dimeric fat radical, the weight ratio of (1):(2) ranging from substantially 7:3 to 1:3 and filming the resulting mixture onto a substrate in the presence of moist ambient atmosphere.

15. An infusible insoluble resinous composition formed by curing in the presence of moisture a composition whose hardenable components comprise a mixture of (1) a hardenable liquid epoxy resin and (2), as a latent curing agent therefor, a Schiff's base formed by reaction in substantially from 3:2 to 2:3 molar ratios of (a) a carbonyl compound whose molecule contains an olefinic unsaturation selected from the group consisting of an aldehyde and a ketone and (b) a polymer having the recurring structural unit:

$$[\text{—}N(H)\text{—}CH_2\text{—}R\text{—}CH_2\text{—}]$$

wherein R is a hydrocarbon group of at least 14 carbon atoms consisting of a dimeric fat radical, said polymer (b) having at least one primary amino group for reaction with compound (a) to form such Schiff's base.

16. An infusible insoluble resinous film formed by exposing to moist ambient atmosphere a film formed of a coating composition consisting essentially of a mixture of (1) a hardenable liquid epoxy reaction product of a polyfunctional halohydrin and a polyhydric phenol and (2), as a latent curing agent therefor, a Schiff's base formed by reaction in substantially from 3:2 to 2:3 molar ratios of (a) a carbonyl compound whose molecule contains an olefinic unsaturation selected from the group consisting of an aldehyde and a ketone and (b) a polymer having the recurring structural unit:

$$[\text{—}N(H)\text{—}CH_2\text{—}R\text{—}CH_2\text{—}]$$

wherein R is a hydrocarbon group of at least 14 carbon atoms consisting of a dimeric fat radical, said polymer (b) having at least one primary amino group for reaction with compound (a), the weight ratio of (1):(2) ranging from substantially 7:3 to 1:3.

References Cited

UNITED STATES PATENTS 2,352,387   6/1944   Hopff _____ 260—65

GEORGE F. LESMES, *Primary Examiner.*

PAUL LIEBERMAN, *Assistant Examiner.*

U.S. Cl. X.R.

260—33.4, 33.6, 33.8, 65, 72, 429, 429.2, 429.5, 429.9, 436, 438, 439, 446, 447, 448, 566